United States Patent [19]

Suzuki

[11] 4,152,737
[45] May 1, 1979

[54] MAGNETIC RECORDING AND REPRODUCING APPARATUS FOR USE WITH EITHER A TAPE CASSETTE OR A TAPE CARTRIDGE

[75] Inventor: Shoji Suzuki, Iwaki, Japan

[73] Assignee: Alps Motorola Inc., Tokyo, Japan

[21] Appl. No.: 853,703

[22] Filed: Nov. 21, 1977

[30] Foreign Application Priority Data

Nov. 27, 1976 [JP] Japan .................. 51-142764

[51] Int. Cl.² .................. G11B 23/04; G11B 25/06
[52] U.S. Cl. .................. 360/94; 242/199
[58] Field of Search .................. 360/94, 96, 105–106, 360/132, 93; 242/197–200

[56] References Cited

U.S. PATENT DOCUMENTS

| | | | |
|---|---|---|---|
| 3,531,127 | 9/1970 | Harper | 360/94 |
| 3,703,295 | 11/1972 | Yamamoto et al. | 360/94 |
| 3,821,808 | 6/1974 | Wada | 360/94 |
| 3,849,798 | 11/1974 | Ono | 360/94 |
| 3,864,743 | 2/1975 | Staar | 360/94 |
| 4,005,487 | 1/1977 | Asai et al. | 360/94 |
| 4,005,489 | 1/1977 | Asai et al. | 360/94 |
| 4,012,790 | 3/1977 | Lemelson | 360/94 |

Primary Examiner—Alfred H. Eddleman
Attorney, Agent, or Firm—James W. Gillman; Donald J. Lisa; Phillip H. Melamed

[57] ABSTRACT

A magnetically recording and reproducing apparatus selectively applicable to a tape cartridge and a tape cassette and having a first magnetic tape head for playing the tape contained in the cartridge and a second magnetic tape head for recording and reproducing the cassette tape. This apparatus comprises an entryway formed and adapted for receiving the cassette or the cartridge, a holder normally disposed in the entryway for receiving and conveying the cassette, a first means responsive to the cartridge being placed in its partially inserted position of the entryway for moving the holder downward out of the entryway thereby permitting the cartridge to be pushed deeper into the entryway so as to bring the cartridge tape into cooperative engagement with the cartridge tape head, and a second means responsive to the cassette being placed in its fully received position of the holder for moving the holder downward so as to bring the cassette tape into cooperative engagement with the cassette tape head.

5 Claims, 7 Drawing Figures

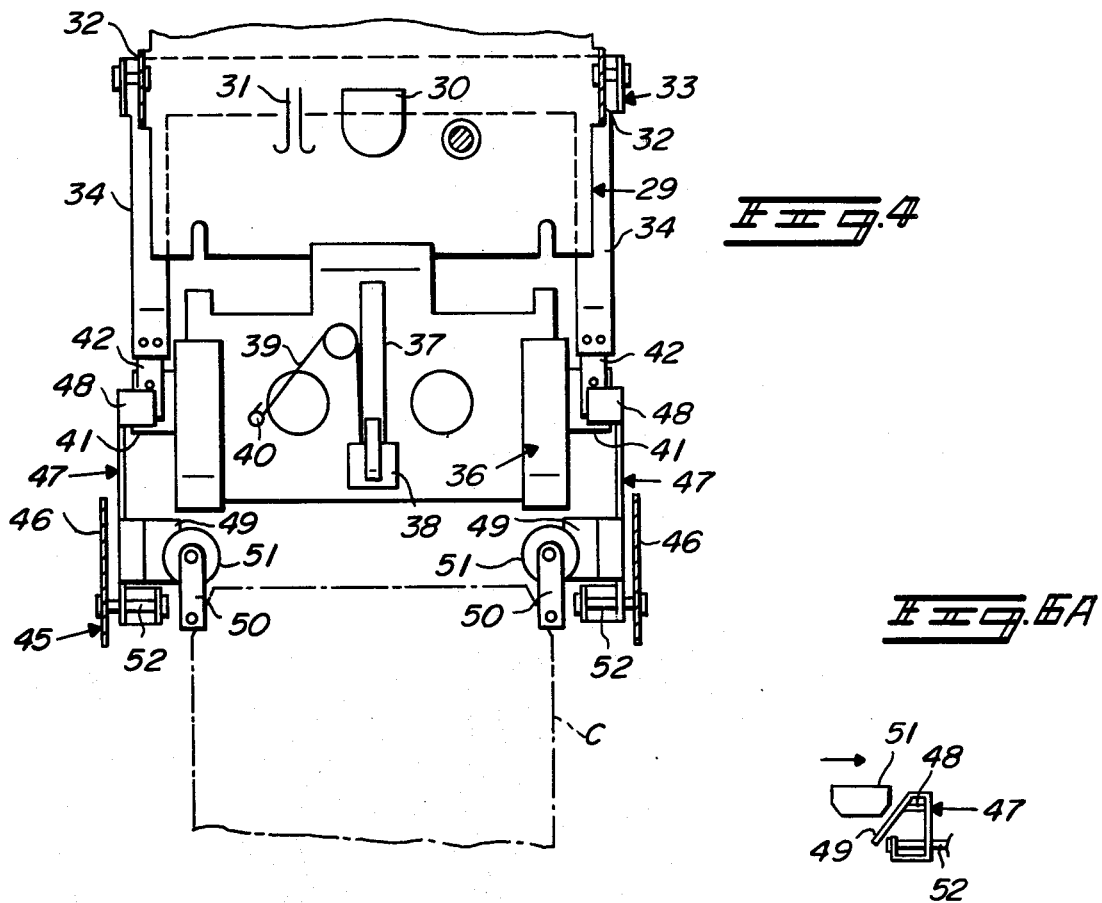
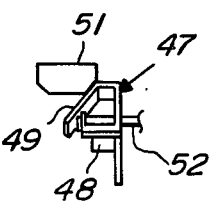
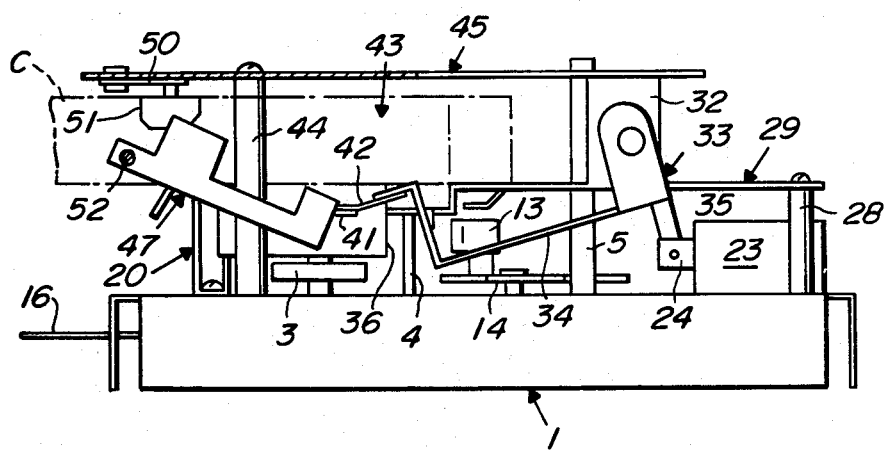

MAGNETIC RECORDING AND REPRODUCING APPARATUS FOR USE WITH EITHER A TAPE CASSETTE OR A TAPE CARTRIDGE

CROSS REFERENCE TO RELATED APPLICATIONS

The present application is related to copending U.S. patent application Ser. No. 836,266, filed Sept. 26, 1977, entitled "Magnetic Recording and Reproducing Apparatus" having the same inventor and assignee as the present application.

BACKGROUND OF THE INVENTION

This invention relates to an improved magnetic tape recording and reproducing apparatus and, more particularly, to a magnetically recording and reproducing apparatus selectively applicable both to a tape cartridge containing an endless magnetic tape and to a tape cassette containing a magnetic tape driven in reel-to-reel operation.

In general, two kinds of tape packs, one known as cassette type containing a magnetic tape fed in reel-to-reel operation and the other known as cartridge type containing an endless tape, are available on the market. However, two kinds of tape players are required to record or reproduce such different typed tape packs because of the difference in shape, their driving mechanism, etc.

Therefore, it is an object of the present invention to provide an improved magnetic tape recording and reproducing apparatus which is selectively applicable both to a tape cartridge containing an endless magnetic tape and to a tape cassette containing a magnetic tape driven in reel-to-reel operation and which will be free from the above-mentioned disadvantages of the prior art devices and efficient in use.

In accordance with the present invention, there is provided a magnetically recording and reproducing apparatus comprising an entryway formed and adapted for receiving a tape cartridge or a tape cassette, a first magnetic tape head disposed in the deepest end of the entryway for playing the tape contained in the cartridge, a second magnetic tape head disposed below the entryway for recording and reproducing the tape contained in the cassette, a holder normally disposed in the entryway for receiving and conveying the cassette. Means is provided for moving the holder downward out of the entryway in response to the cartridge being placed in its partially inserted position of the entryway, thereby permitting the cartridge to be pushed deeper into the entryway so as to bring the cartridge tape into cooperative engagement with the first magnetic tape head. Also provided is means responsive to the cassette being placed in its fully inserted position of the holder for moving the holder downward so as to bring the cassette tape into cooperative engagement with the second magnetic tape head.

BRIEF DESCRIPTION OF THE DRAWINGS

For a fuller understanding of the nature and objects of the present invention, reference should be had to the following detailed description taken in connection with the accompanying drawings, in which:

FIG. 4 is a plan view of the magnetically recording and reproducing apparatus of FIG. 2 with the cover removed;

FIG. 5 is a side view of the apparatus of FIG. 2 with the tape cartridge shown only in a partially inserted state; and FIGS. 6a and 6b are front views showing the operative relationship between the rotary lever and the pusher.

DESCRIPTION OF THE PREFERRED EMBODIMENT

Figure 1:
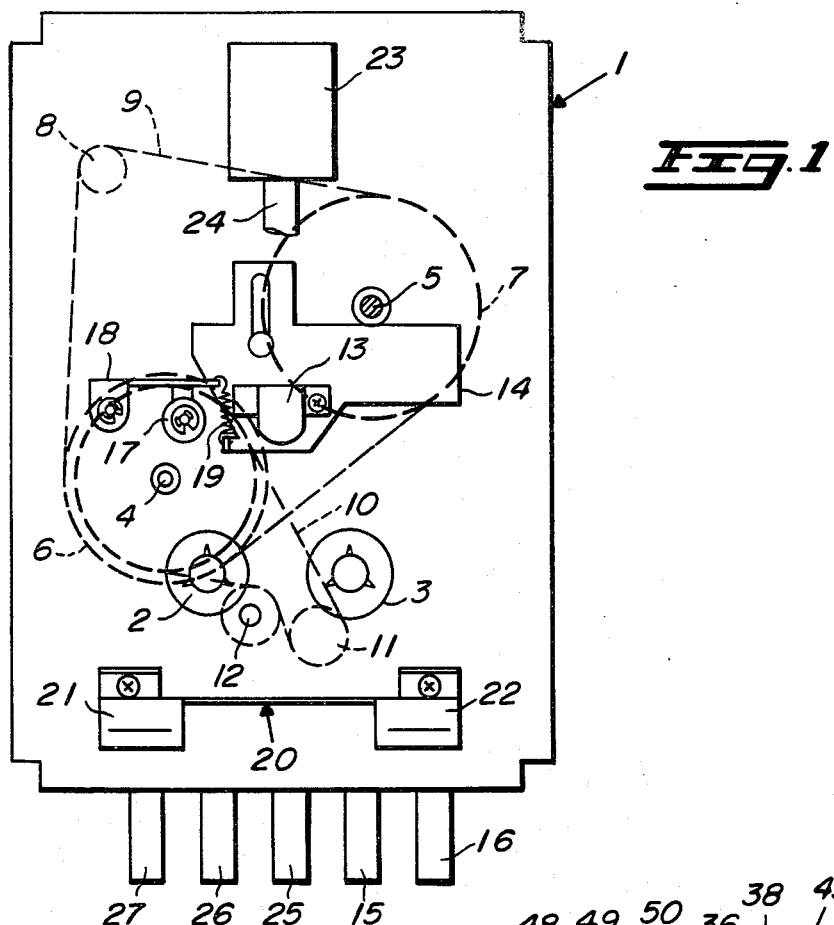
FIG. 1 a plan view of the mechanisms disposed on the base frame with the drive mechanism shown by dotted lines.

Referring now to the drawings, and initially to FIG. 1 thereof, there is illustrated a cassette tape deck to be associated with a cassette tape when a tape cassette moves downward into a predetermined position. Disposed on a base frame 1 are a take-up reel axle 2, a supply reel axle 3 and a capstan drive 4. A capstan drive 5 is provided on the rear portion of the base frame 1. The capstan drives 4 and 5 have respective flywheels 6 and 7 thereon which are driven through a drive belt 9 by means of a motor 8 and thereby rotate the capstan drives 4 and 5, respectively. The rotation of the flywheel 6 is transmitted through a belt 10 to an idler wheel 11 which, in turn, is transmitted to either of the reel axles 2 and 3 through idler wheels, not shown. A drive pulley 12 is adapted to shift so that the take-up reel axle 2 can be rotated during cassette recording or reproducing operation. A magnetic tape head 13 is disposed on a head supporter 14 which is adapted to move in the forward and rearward direction by the operation of a reproducing operation rod 15 or a recording operation rod 16. A pinch roller 17 is disposed on a retaining plate 18. A coil spring 19 is disposed between the head supporter 14 and the retaining plate 18 for pulling the retaining plate 19 against the capstan drive 4 when the head supporter 14 moves in the forward direction. The reference numeral 20 indicates a front plate provided with shoulders 21 and 22 (see FIG. 3), the numeral 23 a solenoid plunger for moving a holder to be described, the numeral 24 a plunger member, the numeral 25 a stop operation rod, the numeral 26 a fast forward operation rod and the numeral 27 a rewind operation rod.

Figure 2:
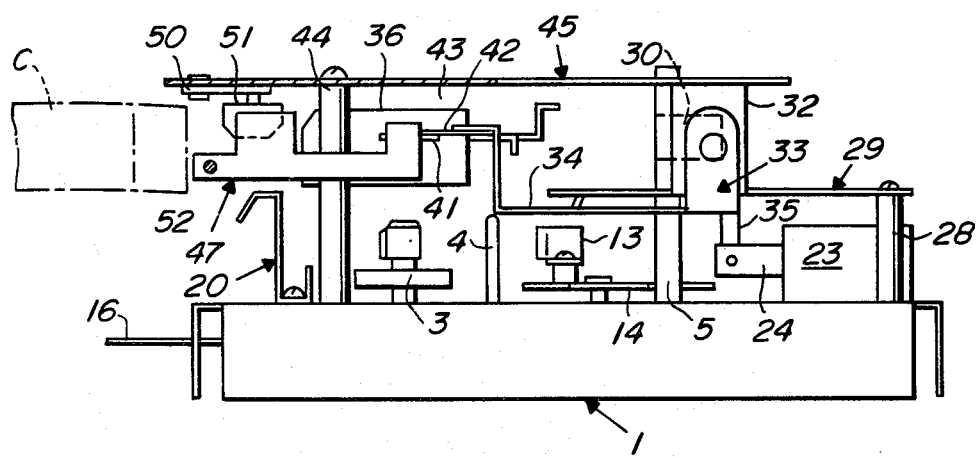
FIG. 2 is a side view of the magnetically recording and reproducing apparatus in accordance of the present invention.

As shown particularly in FIGS. 2 and 4, an intermediate base plate 29 is attached to the base frame 1 through guide pins 28. Provided on the intermediate base plate 29 is a magnetic tape head 30 to be associated with the cartridge tape. The magnetic tape head 30 is adapted to move vertically up and down by means of a channel selecting mechanism, not shown. Disposed adjacent the magnetic tape head 30 is a contact switch 31 for actuating by the function of a conductive foil piece (not shown) provided on the magnetic tape contained in the cartridge so as to actuate the channel selecting mechanism. The intermediate base plate 29 is formed at its opposite sides with upturned portions 32 and 32 to which a rotary member 33 is rotatably mounted. The rotary member 33 has spaced arms 34 and 34 parallelly extending from its opposite ends and a downwardly extending projection 35 which is coupled to the plunger member 24 of the solenoid plunger 23.

The reference numeral 36 indicates a holder for receiving and conveying the tape cassette in a predetermined position. The holder 36 is formed centrally with a guide groove 37 in which a slider member 38 is provided for sliding movement therealong. A toggle spring 39 is disposed between the slider member 38 and a pin 40 provided on the holder 36. When the cassette is inserted into the holder 36, the cassette engages and pushes the slider member 38 against the force of the toggle spring 39. On the way of the sliding member moving, the toggle spring 39 has its force reversed to move the slider member along with the cassette deeper into the holder 36 so that the cassette can be fully received into the holder 36.

As best seen in FIG. 4, the holder 36 is formed at its opposite sides with outwardly extending projections 41 and 41, each of which is connected through leaf springs 42 and 42 to the arm 34 of the rotary member 33 so that the holder 36 which is normally placed in the entryway can be moved down into a predetermined position by the rotation of the rotary member 33 resulting from the plunger member 24 moved when the solenoid plunger 23 is energized. The reference numeral 45 indicates a cover attached to the base frame 1 through guide pins 44 and attached to the intermediate base plate 29 through the upturned portions 32 and 32 thereof, and the numerals 46 and 46 side walls of the cover 45. Pivotally mounted to the side walls by pins 52 and 52 are rotary levers 47 and 47 each of which has a cooperative end 48 in engagement with the projection 41 of the holder 36 and a cooperative portion 49 in engagement with a pusher 51 to be described.

The reference numerals 50 and 50 indicate rock levers pivotally mounted to the cover 45, each of which is provided with a pusher 51 so disposed within the entryway 43 that the cartridge only can engage the pusher 51 when inserted into the entryway 43.

Figure 3:
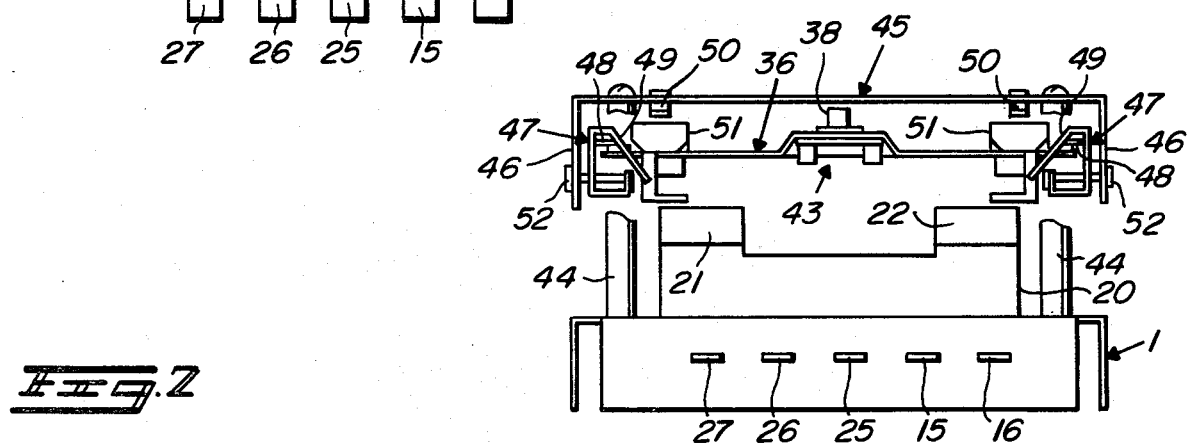
FIG. 3 is a front view of the apparatus of FIG. 2.

The operation of the magnetically recording and reproducing apparatus of the present invention will now be described. Before the tape cartridge is inserted into the entryway 43, the holder 36 and the pushers 51 and 51 are placed in the entryway 43 as shown in FIGS. 2 and 3. When the cartridge is inserted into the entryway 43, the cartridge pushes the pushers 51 and 51 and rotates the rock levers 50 and 50 outward so as to remove the pushers 51 and 51 from the entryway 43 thereby causing the pushers 51 and 51 to push the cooperative portions 49 and 49. As a result, the rotary levers 47 and 47 rotate downward about the pins 52 and 52 as shown in FIG. 5 and thereby the cooperative ends 48 and 48 of the rotary levers 47 and 47 push the projections 41 and 41 of the holder 36 so that the holder 36 can move downward out of the entryway 43. This permits the cartridge to be pushed deeper into the entryway 43 and placed in a predetermined position where the cartridge tape comes into cooperative engagement with the magnetic tape head 30.

Operating a discharge switch (not shown) permits the cartridge to discharge and then the holder 36 and the pushers 51 and 51 return to the original positions.

Where the cassette is inserted into the entryway 43, the cassette cannot push the pushers 51 and 51 because the thickness of the cassette is about one-half the thickness of the cartridge. When the cassette is inserted into the holder 36, it engages and pushes the slider member 38 against the force of the toggle spring 39 disposed between the slider member 38 and the holder 36. The toggle spring 39 has its force reversed on the way of the slider member 30 sliding along the guide groove 37 so as to pull the cassette deeper into the holder 36. When the cassette is placed in the predetermined position within the holder 36, a switch (not shown) is actuated to energize the solenoid plunger 23 and attract the plunger member 24. As a result, the rotary member 33 rotates and thereby the holder 36 moves downward so that the cassette can be placed in the predetermined position and the cassette tape comes into cooperative engagement with the reel axles 2 and 3, where the cassette tape is subject to recording, reproducing, fast forward, and rewind operations under the operation of the operation rods 15, 16 and 25 to 27. Operating the discharging switch permits the solenoid plunger to the deenergized and the holder 36 returns to the original position by the force of a spring member (not shown) and then the cassette is discharged.

While the present invention has been particularly shown and described with reference to the preferred embodiment thereof, it will be understood by those skilled in the art that the foregoing and other changes in form and details may be made therein without departing from the spirit and scope of the present invention. I claim:

1. A magnetically recording and reproducing apparatus which is selectively applicable to a tape cartridge and a tape cassette and includes a cartridge tape capstan, a cassette tape capstan, and reel drive axles, said apparatus comprising:
    an entryway formed and adapted for receiving said cassette or said cartridge;
    a first magnetic tape head disposed in the deepest end of said entryway for playing the tape contained in said cartridge;
    a second magnetic tape head disposed below said entryway for recording and reproducing the tape contained in said cassette;
    a holder and means for normally disposing said holder in said entryway for receiving and conveying said cassette;
    a first mechanical coupling means responsive to said cartridge being inserted into said entryway for being contacted by said cartridge and moving said holder downward out of said entryway by mechanically coupling said cartridge to said holder thereby permitting said cartridge to be pushed deeper into said entryway so as to bring said cartridge tape into cooperative engagement with said first magnetic tape head and said cartridge capstan; and
    a second means responsive to said cassette being placed in its fully inserted position in said holder for moving said holder and said inserted cassette downward out of said entryway so as to bring said cassette tape into cooperative engagement with said second magnetic tape head and said second capstan out of said entryway.

2. A magnetically recording and reproducing apparatus which is selectively applicable both to a tape cartridge and to a tape cassette and includes a cartridge tape capstan, a cassette tape capstan, and reel drive axles, said apparatus comprising:
    an entryway formed and adapted for receiving said cassette or said cartridge;
    a first magnetic tape head disposed in the deepmost end of said entryway for playing the tape contained in said cartridge;
    a second magnetic tape head disposed below said entryway for recording and reproducing the tape contained in said cassette;

a holder and means for normally disposing said holder in said entryway for receiving and conveying said cassette, said holder formed with outwardly extending projections;

a rotary member pivotally mounted and provided with a downwardly extending projection, said rotary member having parallel extending arms each having a free end connected to an associated one of said projections of said holder;

a mechanism including a plunger coupled to said downwardly extending projection of said rotary member, a solenoid for moving said plunger when energized, a contact switch disposed in the deepmost end of said holder for energizing said solenoid when said cassette is placed in its fully received position and in contact with said contact switch so that said holder and received cassette will be moved downward into a predetermined position out of said entryway where said cassette tape comes into cooperative engagement with said second magnetic tape head and said cassette capstan; and mechanical coupling means responsive to said cartridge being initially placed in said entryway for rotating said rotary member, by mechanically coupling said cartridge to said rotary member, to move said holder downward due to said parallel arms of said rotary member pushing said holder projections downward thereby permitting said cartridge to be pushed deeper into said entryway so as to bring said cartridge tape into cooperative engagement with said first magnetic tape head and said cartridge capstan.

3. An apparatus as set forth in claim 2, wherein said mechanically coupling means comprises rotary levers disposed on the opposite sides of said entryway each of which has its one end pivotally mounted and the other end thereof resting on said projection of said holder, rock levers each having its one end pivotally mounted and the other end thereof provided with a pusher, said pusher disposed in said entryway in such a position that although said cassette cannot engage the same, the cartridge can push the same to rotate said rock lever outward into engagement with said rotary lever when inserted into the entryway so that said rotary lever can push said projection of said holder to move said holder downward.

4. An apparatus as set forth in claim 1 which further comprises said holder formed centrally with a guide groove extending in the direction of said cassette being inserted thereinto, a slider member for sliding movement along said cassette, a toggle spring disposed between said slider member and said holder so as to have its force reversed on the way of said slider member sliding deeper into said holder thereby permitting said cassette to be placed in its fully received position of said holder.

5. An apparatus as set forth in claim 2 which further comprises said holder formed centrally with a guide groove extending in the direction of said cassette being inserted thereinto, a slider member for sliding movement along said cassette, a toggle spring disposed between said slider member and said holder so as to have its force reversed on the way of said slider member sliding deeper into said holder thereby permitting said cassette to be placed in its fully received position of said holder.

* * * * *